United States Patent [19]

Esterowitz et al.

[11] 4,330,763

[45] May 18, 1982

[54] RESONANTLY PUMPED MID-IR LASER

[75] Inventors: Leon Esterowitz, Springfield, Va.; Melvin R. Kruer, Oxon Hill, Md.

[73] Assignee: The United States of America as represented by the Secretary of the Navy, Washington, D.C.

[21] Appl. No.: 131,349

[22] Filed: Mar. 19, 1980

[51] Int. Cl.³ .............................................. H01S 3/16
[52] U.S. Cl. ..................................................... 372/41
[58] Field of Search .................................. 331/94.5 F

[56] References Cited

PUBLICATIONS

Jenssen et al., Stimulated Emission at 5445 Å in $Tb^{3+}$:YLF, IEEE J. Quant. Elect., vol. QE-9, No. 6 (Jun. 1973), p. 665.

Primary Examiner—William L. Sikes
Attorney, Agent, or Firm—Robert F. Beers; William T. Ellis; Philip Schneider

[57] ABSTRACT

A solid-state laser operative in the mid infrared region (3–5 μm) comprises a YLF laser including a trivalent terbium activator which is pumped by a resonant external laser source (Ho:YLF, 2.06 μm laser) to directly populate the upper laser level which achieves inversion before non-radiative decay depletes the initial laser-level population. The initial laser manifold that is externally pumped is the $^7F_2$ manifold. Inversion is then between the $^7F_3$ and $^7F_5$ manifolds and laser oscillation at 4.1 μm is obtained.

5 Claims, 2 Drawing Figures

RESONANTLY PUMPED MID-IR LASER

BACKGROUND OF THE INVENTION

This invention relates to solid-state lasers and more particularly to a solid-state laser operative in the mid-infrared spectrum.

Heretofore, gas lasers have been made which are capable of operation in the infrared region of the spectrum and solid-state lasers have been made that operate below the mid-infrared region. The standard approach for exciting solid-state lasers is to use broadband incoherent sources to pump the energy levels in rare earth, transition metal or actinide activator ions. It has been determined that for wavelength transitions greater than 3 μm, the decay is predominantly non-radiative. It has been concluded by others in the laser field that laser emission by solid-state lasers beyond 3.3 μm is unlikely since fluorescence at these long wavelengths is overwhelmed by non-radiative relaxation due to multiphonon emission. Prior art relating such a teaching is found in an articler, "Laser Emission at 3 μm from $Dy^{3+}$ in $BaY_2F_8$", by L. F. Johnson and H. J. Guggenheim, Applied Phys. Lett., Vol. 23, #2, pp 96–98, 15 July 1973. The prior art herein relates to $Dy^{+3}$ emission enhanced by $Er^{+3}$, $Yb^{+3}$, $Tm^{+3}$, or $Ho^{+3}$. A comparison of radiative and non-radiative relaxation rates for rare-earth ions in $BaY_2F_8$ indicates that an extension of laser emission to 4 μm is unlikely.

SUMMARY OF THE INVENTION

Resonant pumping from an external laser source directly populates the upper laser level to achieve inversion before non-radiative decay depletes the initial laser-level population. An upper energy level is pumped such that an inversion is achieved which permits laser oscillation at about 4.1 μm.

DETAILED DESCRIPTION

Figure 1:
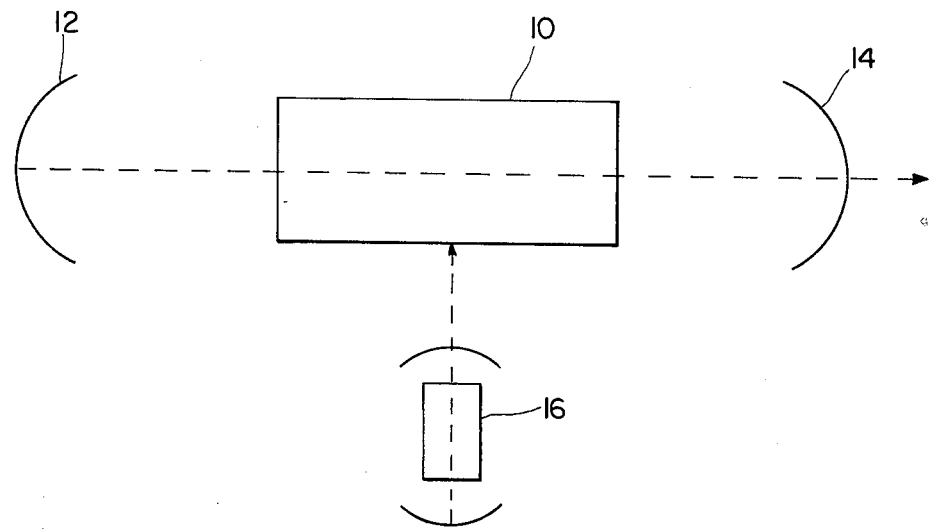
FIG. 1 is a block diagram of the laser system.

FIG. 1 illustrates a trivalent Tb:YLF solid-state laser element 10 within a cavity formed by mirrors 12 and 14. The laser element 10 is pumped by a Ho:YLF laser system 16 having an output of 2.06 μm such as set forth in the article, "Deep Red Laser Emission in Ho:YLF", by E. P. Chicklis, C. S. Maiman, L. Esterowitz and R. Allen, in *IEEE Journal of Quantum Electronics Letters*, Vol. QE13, No. 11, pp. 893–895 November 1977. Such a laser is also set forth in U.S. Pat. No. 4,110,702. The pump radiation resonantly pumps the terbium ions to directly populate the upper laser energy level $^7F_2$, electrons relax to the $^7F_3$ energy level with an inversion achieved between the $^7F_3$ and $^7F_5$ manifolds before non-radiative decay depletes the initial laser level population.

Figure 2:
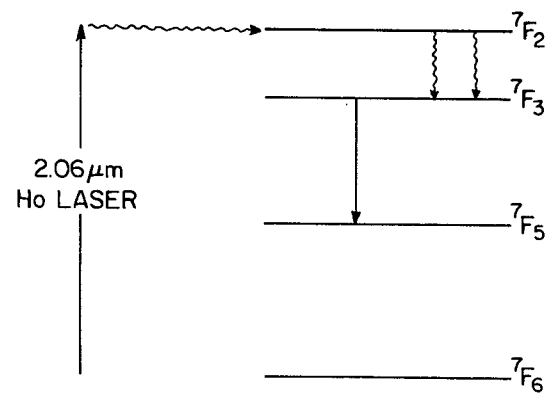
FIG. 2 is a diagram showing the relevant energy levels of the laser.

The energy level diagram for the above described laser which operates at about 4.1 μm is shown in FIG. 2. Laser transition at about 4.1 μm is achieved because of resonant pumping which directly populates the upper laser level which achieves inversion before non-radiative decay depletes the initial laser-level population.

The laser medium is formed by use of any well-known crystal growth process by which trivalent terbium is uniformly mixed throughout the YLF crystal where the trivalent terbium is about 2% of the total mixture. Such methods are well-known in the crystal growth art and it is believed not necessary to set forth the complete process herein.

It has been determined that standard incoherent pumping techniques cannot be used to achieve inversion for the terbium $^7F_3 \rightarrow {}^7F_5$ laser transition due to the large ratio of non-radiative to radiative decay rates. Therefore it is necessary that resonant pumping be used in order to obtain a long wavelength laser operation of about 4 μm.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. An optically pumped solid-state laser which comprises:
    a laser cavity;
    a laser medium including trivalent terbium-doped yttrium lithium fluoride crystal that is capable of lasing at about 4.1 μm disposed within said laser cavity; and
    resonant pumping means for supplying pump energy of a predetermined infrared wavelength to said laser medium to achieve laser oscillation at about 4.1 μm.

2. An optically pumped solid-state laser as claimed in claim 1 wherein:
    said resonant pumping means is a holmium-doped yttrium lithium fluoride crystal having an output of about 2.06 μm.

3. An optically pumped laser comprising:
    a laser cavity;
    a laser medium of trivalent terbium-doped yttrium lithium fluoride crystal having a plurality of energy levels including the $^7F_2$, the $^7F_3$ and $^7F_5$ energy levels disposed within said laser cavity; and
    resonant pumping means for supplying energy of a given wavelength to said laser medium in order to populate the $^7F_2$ energy level thereof which will result in laser oscillation at about 4.1 μm between the $^7F_3$ and $^7F_5$ energy levels.

4. An optically pumped laser as defined in claim 3, wherein:
    said resonant pumping means is a holmium-doped yttrium lithium fluoride crystal having an output of about 2.06 μm.

5. An optically pumped laser which comprises:
    a laser cavity;
    a laser medium of trivalent terbium-doped yttrium lithium fluoride crystal within said laser cavity; and
    resonant pumping means of holmium-doped yttrium lithium fluoride crystal for supplying pump energy to said laser medium to achieve laser oscillation.

* * * * *